United States Patent
Bourne et al.

(10) Patent No.: US 8,891,267 B2
(45) Date of Patent: Nov. 18, 2014

(54) AC-DC CONVERTER WITH ADAPTIVE CURRENT SUPPLY MINIMISING POWER CONSUMPTION

(75) Inventors: Paul Bourne, Hendon (AU); Philip Tracy, Hendon (AU); David Murfett, Hendon (AU)

(73) Assignee: Hendon Semiconductors Pty. Ltd., South Australia (AU)

( * ) Notice: Subject to any disclaimer, the term of this patent is extended or adjusted under 35 U.S.C. 154(b) by 0 days.

(21) Appl. No.: 13/819,968

(22) PCT Filed: Aug. 31, 2011

(86) PCT No.: PCT/AU2011/001123
§ 371 (c)(1),
(2), (4) Date: Apr. 16, 2013

(87) PCT Pub. No.: WO2012/027789
PCT Pub. Date: Mar. 8, 2012

(65) Prior Publication Data
US 2013/0201735 A1    Aug. 8, 2013

(30) Foreign Application Priority Data
Sep. 3, 2010    (AU) ................ 2010903958

(51) Int. Cl.
*H02M 7/04* (2006.01)
*G05F 3/16* (2006.01)
*H02M 7/12* (2006.01)
*H02M 7/217* (2006.01)
*H02M 1/00* (2006.01)

(52) U.S. Cl.
CPC ...... *H02M 7/125* (2013.01); *H02M 2001/0032* (2013.01); *Y02B 70/16* (2013.01); *H02M 7/217* (2013.01); *H02M 7/2176* (2013.01)

USPC ............................................ 363/89; 323/313

(58) Field of Classification Search
USPC ............ 323/313–317; 363/16, 34, 37, 44, 50, 363/52, 53, 55, 56.01, 61, 74, 76, 78, 81, 363/84, 89, 108, 125–127
See application file for complete search history.

(56) References Cited

U.S. PATENT DOCUMENTS

| | | | | |
|---|---|---|---|---|
| 5,055,994 A * | 10/1991 | Schoofs | ........................ | 363/127 |
| 5,801,933 A * | 9/1998 | Ravid | .............................. | 363/89 |
| 5,864,473 A | 1/1999 | Slack et al. | | |
| 6,973,337 B2 * | 12/2005 | Jiguet et al. | .................... | 455/574 |
| 7,889,526 B2 * | 2/2011 | Baby | ................................ | 363/89 |
| 2003/0211870 A1 * | 11/2003 | Jiguet et al. | .................... | 455/574 |
| 2009/0128048 A1 | 5/2009 | Nerone | | |

FOREIGN PATENT DOCUMENTS

JP    2008061414    3/2008

* cited by examiner

*Primary Examiner* — Jessica Han
*Assistant Examiner* — Ivan Laboy Andino
(74) *Attorney, Agent, or Firm* — Renner Kenner Greive Bobak Taylor & Weber

(57) ABSTRACT

A circuit arrangement with standby mode minimizing power and/or current consumption having a mains AC power supply terminals and an active circuit capable of converting said mains AC power to lower voltage DC levels for operating in an active mode or in a standby mode as required by an appliance such that the selection of the current sensing resistor value for said current sensing resistor limits the maximum peak current through the FET so that the current sensing resistor arrangement is capable of providing significant increases in a steeper rise time of the current at around mains AC power supply zero crossing, so that current is pulled high while the mains AC power supply voltage is low.

12 Claims, 2 Drawing Sheets

AC-DC CONVERTER WITH ADAPTIVE CURRENT SUPPLY MINIMISING POWER CONSUMPTION

TECHNOLOGICAL FIELD

This invention relates to a circuit arrangement capable of reducing standby power consumption of electronic devices and more particularly a unique circuit arrangement that can not only potentially minimise standby power in a power supply system but also complete such a task without having to incorporate complex and expensive switching regulators in order to establish such power efficiency during standby operation mode of the device.

BACKGROUND ART DISCUSSION

It is now well recognised that most conventional households as well as commercial premises include a wide variety of electrical products that contain power supplies in order for the appliance to be able to convert the property's mains AC power supply to a usable DC (direct current) to power the relevant electrical appliance or device into operation.

While it may seem a straight forward arrangement for a standard power supply to simply step down the incoming mains AC power supply voltage to a workable DC level, these days however more functionality is required from such devices.

Not only does the power supply technology need to be able to switch from an active mode to a standby mode, it needs to do so with an efficiency so that even in the standby mode when there still is the requirement for the appliance or application to draw some electrical power, that the drawing of this electrical power to supply enough current to devices such as control circuits, micro-controllers and status indicators and so forth in the appliance is done so in an arrangement that meets the requirements now placed by many governments and certification systems demanding not only the simple functionality of having active and standby modes but also the efficiency and the energy savings to operate when each of these modes is selected.

Therefore modern day technology and requirements of a standard power supply system will demand that it provides functionality to present an active mode for the powered device which means that the circuit arrangement allows through the whole of the current necessary for the active circuit, with a minimal voltage drop, and without needless power consumption in this active mode but also in the standby mode the device is also required to be adapted to supply enough current to supply those circuits and controllers still operating in the standby mode of the appliance.

At present there are several methods available including linear regulation, step down transformers and switch mode power supply switches that attempt to provide suitable arrangements in order to establish operable active and standby modes with the required current supply for each mode with the functionality of the electrical appliance to be realised when in use or in standby.

Nonetheless there are problems with conventional linear regulators utilising resistors and/or capacitors. While linear regulators may maintain the desired output voltage by dissipating excess power in ohmic losses, regrettably a linear regulator will just regulate either output voltage or current by dissipating the excess electrical power in the form of heat, and hence its maximum power efficiency in voltage out/voltage in is unacceptable since the volt difference is wasted.

Accordingly these kinds of linear power supplies make them unsuitable in today's environment where emphasis is on saving energy and protecting the environment and so forth by reducing energy consumption.

In order to obtain far greater efficiencies and minimise this wasted energy of linear regulators in the standby mode, sophisticated power supplies that include a semiconductor switcher are now being used. For example a switch mode power supply wherein incorporated into the overall design of the power supply is a switching regulator which is adapted to transfer power from a source-like electrical power grid such as the mains AC power supply to the household appliance while converting voltage and current characteristics. For the most part switch mode power supplies are capable of efficiently providing a regulated output voltage in the standby mode.

Nonetheless any circuit that includes a switching mode power supply at the expense of a more simplified linear power supply introduces complexity into the design which could increase manufacturing costs and so forth, and also as a switch mode power supply operates on the procedure of switching mode supply between full on and full off states by simply varying the ratio of 'on' to 'off' time of the output signal, this may lead to the generation of high amplitude, high frequency energy, resulting potentially to radio frequency interference (RFI) and/or electro-magnetic interference (EMI), unless expensive and complex filtering is included with the switching circuit arrangement.

Therefore as can be observed from the above conventional methods available for the power supply of adequate current to appliances when they are in either an active mode or standby mode, seems to be lacking in a solution that can not only be simple such as linear regulators in order to provide a current level suitable to operate the device in standby mode but without the losses, but also an arrangement like a switching regulator that provides the high efficiency and energy saving that one would expect from the utilisation of the complicated switch mode power supply arrangements, but without the potential problems associated with RFI, EMI and the complexity of design.

It is therefore an object of this invention to provide a circuit arrangement with a standby mode minimising power and/or current consumption that will be able to provide the necessary current to the device during the standby mode for the device's control circuits, micro controllers, status indicators and so forth to operate in the standby mode, but to operate in this standby mode without simply drawing a linear powered supply, but in fact having a regulated power supply during the standby mode, wherein the regulating activity is not leading to the creation of RFI and EMI problems.

SUMMARY OF THE INVENTION

Accordingly in one form of the invention there is provided a circuit arrangement with standby mode minimising power and/or current consumption having a mains AC power supply terminals and an active circuit capable of converting said mains AC power to lower voltage DC levels for operating in an active mode or in a standby mode as required by an appliance, said circuit including;

one or more rectifying diodes to provide a rectified AC output from the mains AC supply;

a mains voltage detection arrangement in communication with said rectified AC signal and in series with an AC mains supply rated resistor, wherein said resistor supplies output to a first bandgap circuit that with a selected defined voltage level provides a regulatable current path;

said regulatable current path including a gate to a field effect transistor (FET) controlled electronic switch with the drain of the FET connected to the rectified AC signal and the source of the FET connected to a load circuit, said load circuit having at least a capacitor and a load;

said mains voltage detection arrangement also including a second bandgap circuit providing a low DC voltage detector to detect when a selectable voltage has been achieved across the load so that once this has been achieved the low DC voltage detector communicates with the first band gap circuit to lower the mains detection voltage, thereby reducing the power allowed to pass through the FET;

a current sensing resistor in series between said source of the FET controlled switch and said load circuit wherein the current sensing resistor is also in communication with a capacitor/resistor filter that feeds back into an active component regulator transistor in electrical connection with the regulated current path through to the gate of said FET so as to control the amount of current flowing through the FET to the load circuit;

such that the selection of the current sensing resistor value for said current sensing resistor limits the maximum peak current through the FET so that the current sensing resistor arrangement is capable of providing significant increases in a steeper rise time of the current at around mains AC power supply zero crossing, so that current is pulled high while the mains AC power supply voltage is low.

In preference the selectable voltage is 3.3V or 5V.

Advantageously through the use of the current sensing resistor arrangement regulation is now possible through the rise and fall times of the current pulse along the current path to the gate of the FET to provide output to the load circuit with a wave form characterised with a trapezoidal shape.

Compared to more conventional circuit arrangements, such as the one presented in U.S. Pat. No. 6,061,259, the advantage of this being that the arrangement is able to pull more current while the mains voltage is low, hence providing more current to the output whilst using the same power. This implies the circuit of this invention is more efficient.

This circuit arrangement through the use of the current sensing resistor in series between the source of the FET and the load circuit along with its feedback filter into a regulator, such as a transistor and so forth in direct communication with the current path flowing through to the gate of the FET means that rather than simply having the FET operating between full 'on' and full 'off' states, which while may provide or minimise wasted energy, such voltage regulation as introduced above with varying ratios of 'on' to 'off' time at high frequencies will lead to RFI and EMI considerations.

Advantageously in this circuit arrangement voltage division is taking place close to the mains voltage zero crossing and with voltage at lowest possible levels, current can then be taken to a maximum level to achieve the necessary supply to the load during the standby mode but without importantly any unnecessary creation of wasted power which is then only to be dissipated across a power limiting resistor.

Power consumption is able to be reduced as voltage is kept to a minimum but current brought up to its required maximum peak as stipulated in the selection of the resistor value for the current sensing resistor depending on the application. Therefore while power efficiency is maintain, adequate current is still being provided as required to the device's components during standby.

Therefore this circuit arrangement in standby mode is able to limit the FET current and consequently reduce its consumption to meet the load requirements. The feedback loop mechanism provided for by the capacitor/resistor filter that feeds back into a regulator such as the transistor introduced above that is then in electrical communication with the main current path leading to the gate of the FET is then able to control the amount of current which will ultimately then flow through the FET to the load circuit.

Hence the feedback loop is capable of reducing the FET's peak current and also is able to pull the turn off voltage back towards the mains zero crossing voltage as required. Advantageously in doing so the total circuit consumption will be substantially reduced and if the requirement is to have an appliance or device operated at particular low levels, such as 0.5 watts, this circuit arrangement can provide such levels and not call upon such power when in fact there is no requirement from the components of the device to be drawing any electrical power even during standby mode operation.

Unlike in conventional circuit arrangements, such as the one presented in U.S. Pat. No. 6,061,259, the current sensing resistor in series between the source of the FET and the load circuit is not acting as a current limiting resistor, and therefore is not needed to limit the current flow. As illustrated in FIG. 2C of U.S. Pat. No. 6,061,259 a triangular current wave form is being produced by the described circuitry.

This is an expected result in that the current limiting resistor in U.S. Pat. No. 6,061,259 unlike the current sensing resistor in the circuit arrangement provided for in this invention is essentially just switched in and out of the mains AC power supply. Such a configuration results in a peak current being provided for at the maximum mains voltage cut off level resulting in maximum power but the consequence is that by having the produced triangular wave form resulted from fast and maximum current switching at the highest mains voltage introduces significant RFI and EMI considerations.

By reviewing the peak current values shown in FIG. 2C against the voltage level presented for FIG. 2A of this U.S. Pat. No. 6,061,259 it is evident to draw from the design that there clearly is unnecessary and excessive power consumption with current reaching its peak values at a much higher voltage level than is the case in this invention where current is being brought up to its maximum peak at a much lower corresponding voltage.

Advantageously as there is no hard switching on and off between the saturated and unsaturated state of the transistor means that there is a removal of these voltage spikes evident in FIG. 2C of U.S. Pat. No. 6,061,259.

Still further the circuit arrangement presented in FIG. 3 of U.S. Pat. No. 6,061,259 clearly describes two separate current paths for its controlled circuitry. One path is made up of the mains voltage detector divider resistors (13), (14) and (16) and the other is to provide for the FET gate drive.

Advantageously in the circuit arrangement provided for in this invention to keep power consumption down to a minimum during the standby mode of the appliance there is able to be utilised just the one current path for both mains voltage detection and also driving the FET control switch.

In preference the circuit arrangement further includes a power sharing resistor on the drain side of the FET control switch.

An advantage of such an arrangement is that the introduction of this power sharing resistor to the circuit takes some of the power of the FET during switching and also provides protection against transients.

Unlike in U.S. Pat. No. 6,061,259, this power sharing resistor which is acting arguably as an alternative to the application of a heatsink up against the FET control switch, reduces any heat build up but it plays no significant part in controlling the rise and fall times of the current pulse while the mains voltage is low, which leads to less power consumption for this described circuit arrangement.

In preference the circuit arrangement is an integrated circuit wherein the AC mains supply rated resistor is external to the integrated circuitry.

An advantage of such an arrangement is that by keeping the AC mains supply rated resistor external to the chip means that depending on the government regulations in the country to where the circuit will be used with means the resistor can be valued as required giving greater useability of such a circuit across the world and the circuit can therefore accordingly be optimised for different applications.

In preference the capacitor included as part of the load circuit as well as the capacitor included as part of the capacitor/resistor filter working with the current sensing resistor arrangement would be external to the integrated circuit chip.

Advantageously by keeping these particular capacitors external to the integrated circuit chip will reduce the size of the chip and save costs.

In preference the current sensing resistor would be external to the integrated circuit chip providing the ability to select different values for the current sensing resistor leading to the ability to define alternative maximum current peaks and so forth for the circuit arrangement.

In preference the power sharing resistor located on the drain side of the FET control switch is external to the integrated circuit chip providing a power sharing resistor capable of removing some of the dissipated power from the FET control switch thereby reducing the working temperature of the FET control switch.

As the person skilled in the art will appreciate there is not always the requirement to include the power sharing resistor on the drain side of the FET switch in that heat may also be removed from the FET control switch in different ways such as the application of a heatsink and so forth as introduced above.

In order now to described the invention in greater detail a preferred embodiment will be presented with the assistance of the accompanying illustrations.

Nonetheless it is to be remembered by those reviewing this provisional patent application, that the schematics circuit presented in FIG. 1 following herewith provides for one restricted embodiment of a configuration of the circuit which has been described in full above.

Values listed and the outputs shown in the figures are not necessarily preferable but have been listed so as to provide a simulated result using the selected values. The appliance's ultimate power requirements, particularly required level of current to be drawn in both active and standby modes will influence selected component values.

Therefore accordingly each of the components referred to in the schematic circuit of FIG. 1 need not be essential to the invention or their values, wherein the essential aspects of the invention have already been introduced precedingly in the broad description provided for.

BRIEF DESCRIPTION OF THE ILLUSTRATION

DETAILED DESCRIPTION OF THE ILLUSTRATION

Figure 1:
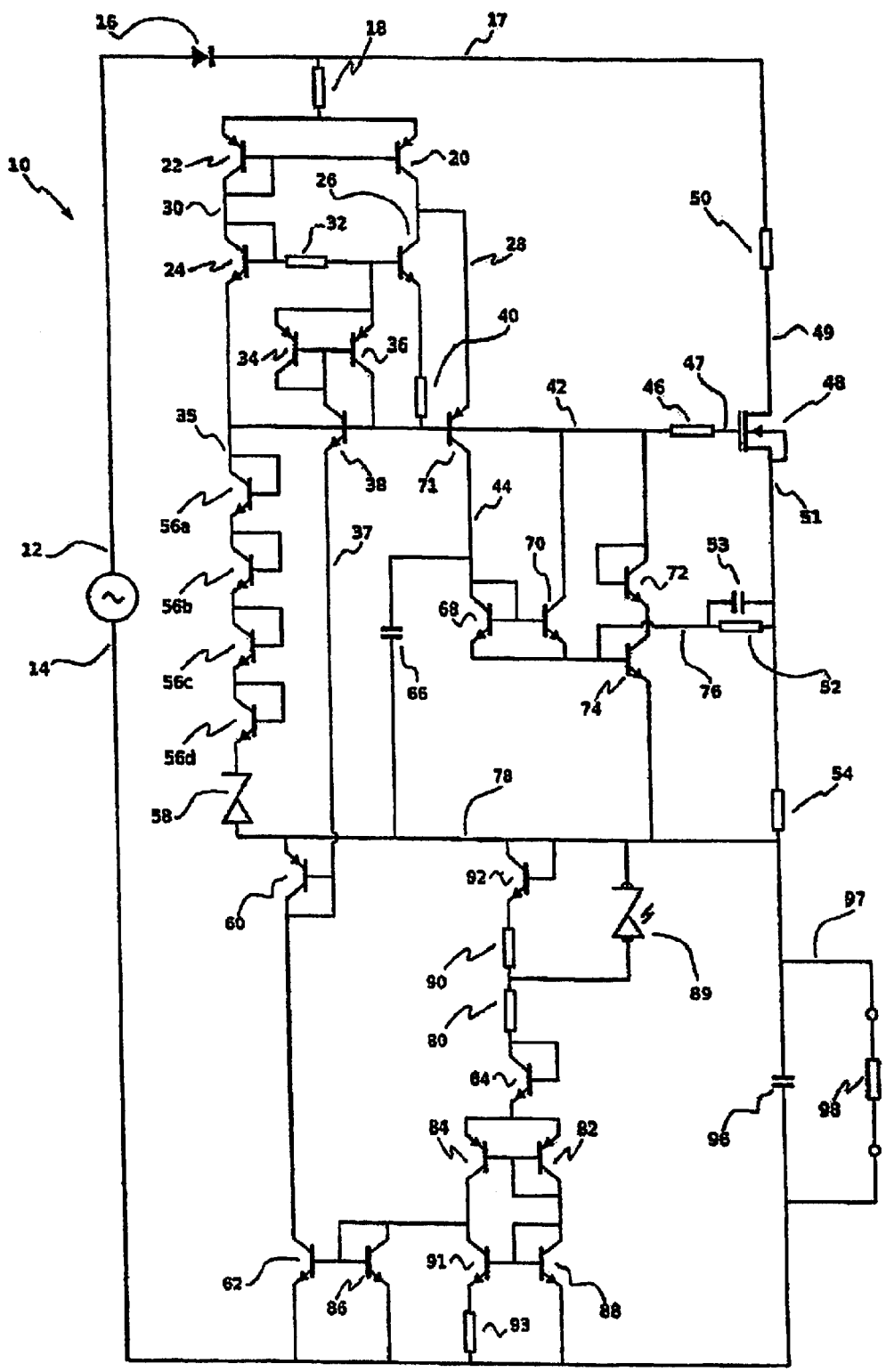
FIG. 1 is a schematic circuit diagram of the arrangement which is able to provide minimized power consumption during standby mode operation to an appliance and at the same time also provide the necessary current requirements to power the appliance from a mains AC power supply during times of use.

Referring now to FIG. 1 in greater detail wherein the circuit (10) provides for mains AC power supply terminals (12) and (14). Rectifying diode (16) provides a half wave (or full wave) rectified AC (or alternating current) (17) which can be dropped across the mains rated resistor (18).

While the circuit (10) shown in FIG. 1 includes just the single rectifying diode (16) to provide the direct current it would be equally possible to configure a full wave bridge rectifier or similar such rectifying functionality into the circuit as required wherein a full wave rectifier would enable a higher maximum output current, but in certain configurations may add additional costing to the circuit as the arrangement becomes slightly more complicated.

Transistors and resistors (20), (22), (24), (26), (40) and (32) provide the first bandgap circuit which for the most part provides required functionality to turn on and off the mains AC power supply to the selected required voltage, which in this preferred embodiment would be around 40 volts. Transistor (71) is a buffer between the top bandgap circuit and the FET gate turn off circuit.

In the preferred embodiment the mains rated resistor (18) would have a value of 1 M ohms and transistors (20), (22), (34) and (36) would be BJT PNP transistors.

Transistors (24) and (26) are BJT NPN transistors.

Resistor (32) would have a preferred value of 25 k ohms and resistor (40) would have a preferred value of 1.1 k ohms.

Pathway (42) provides a current path through resistor (46) with a preferred value of 10 kilo ohms into the gate (47) of the FET control switch (48) wherein the resistor (50) is electrically connected to the drain terminal (49) of the FET (48).

Pathway (35) used to point at the gate protection components path.

The electrical pathway (35) passes through a series of BJT NPN transistors (56A), (56B), (56C) and (56D) and a zener diode (58) through to the regulated output wherein components (56A), (56B), (56C), (56D) and (58) provide a protection string so that the break down voltage of the pathway can be held constant over temperature resulting in the FET gate having a constant over voltage protection to its source as the temperature varies.

For the most part transistors and resistors (62), (64), (80), (82), (84), (86), (91), (93), (88), (90) and (92) provide the internal circuitry for the second bandgap in order to provide 5 volt supply voltage requirements to feed through to the load circuit (97) made up of the load (98) and capacitor (96).

In preference transistors (60), (82) and (84) are BJT PNP type transistors.

In preference resistor (80) has a value of 25.8 kilo ohms and resistor (93) has a value of 2.162 kilo ohms and resistor (90) has a value of 19.8 kilo ohms.

Transistors (62), (64), (86), (88), (91) and (92) are BJT NPN type transistors.

The output voltage of the circuit in this embodiment is 5V but can be adapted to another voltage at design or manufacture using a variety of methods to short out components (90) and (92). One method, a fused-link, is shown as component (89).

Transistors (34), (36), (38), (60), (62) and (86) provide a communication path from the bottom band-gap to the top band-gap to indicate when the bottom band-gap is unable to maintain the regulated voltage, and thus causing the FET to supply additional current to the load.

Generally components (42), (71), (44), (68), (66), (70), (72), (74), (76), (46), (50), (52) and (54) along with (78) are associated for the most part with driving the FET control switch as well as protecting the FET control switch during operation.

Importantly within the circuit arrangement current limiting is done with the sensing resistor (54) which is preferably external to the circuit so that the selection of the value is able to set a value that will then limit the maximum peak current that will pass through the FET control switch (48).

Through the utilization of the current sensing resistor (54) as introduced above this then provides for a much steeper rise time on the current just after a mains zero crossing provided for by the first bandgap circuit. The circuit is then able to pull out more current while the mains voltage is low reducing the power consumption of the circuit.

Resistor (52) at 68 kilo ohms and capacitor (53) at 1 nF provide a filtering arrangement to establish a feedback loop which can reduce the FET control switch (48) peak current and thereby able to turn off the FET's voltage back towards the main zero crossing voltage. As would be expected by being able to configure this arrangement the total circuit consumption will be easily reduced to less then 0.5 watts.

In preference transistor (71) is a BJT PNP and transistors (68), (70), (72) and (74) are BJT NPN transistors.

Figure 2:
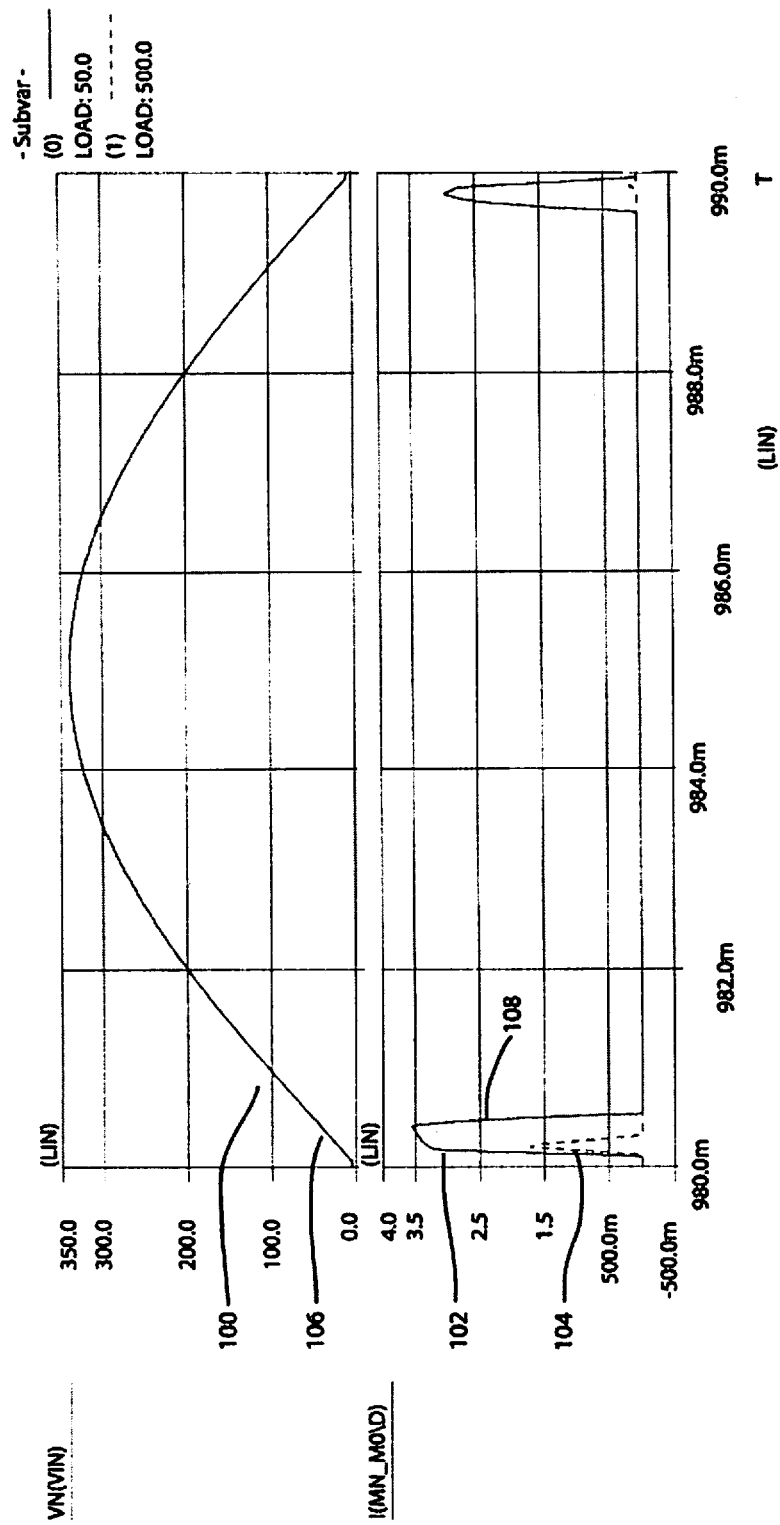
FIG. 2 is a diagram of input voltage of the mains AC power supply (top graph), wherein the bottom graph depicts the current provided by the FET control switch during the same linear time interval with simulated load levels with curves on the plot indicated as load resistances.

FIG. 2 graphically shows a simulated output configuration with a current output from the FET for a load of 10 mA (104) and that of 100 mA shown as (102). Graphically the input voltage of the mains AC power supply is shown at (100) and with (106) the point of simulation.

As illustrated by carefully controlling the rise and fall times of the current pulse this circuit arrangement is able to provide for a wave form that has a more trapezoidal shape, shown generally as (108) rather than arrangements such as those discussed above for U.S. Pat. No. 6,061,259 which are triangular or spiked in configuration which lead to RFI and EMI unfavourable considerations.

The invention claimed is:

1. A circuit arrangement with standby mode minimising power and/or current consumption having a mains AC power supply terminals and an active circuit capable of converting said mains AC power supply to lower voltage DC levels for operating in an active mode or in a standby mode as required by an appliance, said circuit arrangement including:
   one or more rectifying diodes to provide a rectified AC output from the mains AC power supply;
   a mains voltage detection arrangement in communication with said rectified AC output and in series with a mains AC power supply rated resistor, wherein said mains AC power supply resistor supplies an output to a first bandgap circuit that with a selected defined voltage level provides a regulatable current path;
   said regulatable current path including a gate to a FET with a drain of the FET connected to the rectified AC output and a source of the FET connected to a load circuit, said load circuit having at least a capacitor and a load;
   said mains voltage detection arrangement further including a second bandgap circuit providing a low DC voltage detector to detect when a selectable voltage has been achieved across the load so that once the selectable voltage has been achieved the low DC voltage detector communicates with the first bandgap circuit to lower a mains detection voltage, thereby reducing the power allowed to pass through the FET;
   a current sensing resistor in series between said source of the FET and said load circuit wherein the current sensing resistor is also in communication with a capacitor/resistor filter that feeds back into an active component regulator transistor in electrical connection with the regulatable current path through to the gate of said FET so as to control an amount of current flowing through the FET to the load circuit;
   such that a selection of the current sensing resistor value for said current sensing resistor limits the maximum peak current through the FET so that a current sensing resistor arrangement is capable of providing significant increases in a steeper rise time of the current flowing through the FET at around mains AC power supply zero crossing, so the current flowing through the FET is pulled high while the mains AC power supply voltage is low.

2. The circuit arrangement of claim 1 further including a power sharing resistor coupled to the drain of the FET.

3. The circuit arrangement of claim 2 wherein the power sharing resistor is adapted to accept a proportion of the power of the FET during switching and/or provide a protection against transients.

4. The circuit arrangement of claim 2 wherein the power sharing resistor coupled to the drain of the FET is external to an integrated circuit, and the power sharing resistor removes portions of the dissipated power from the FET control switch thereby reducing the working temperature of the FET control switch.

5. The circuit arrangement of claim 1 provided as an integrated circuit.

6. The circuit arrangement of claim 5 wherein the AC mains supply rated resistor is external to the integrated circuit.

7. The circuit arrangement of claim 5 wherein the load circuit capacitor is external to the integrated circuit.

8. The circuit arrangement of claim 7 wherein a current sensing resistor arrangement capacitor is external to the integrated circuit.

9. The circuit arrangement of claim 5 wherein the current sensing resistor is external to the integrated circuit.

10. The circuit arrangement of claim 9 wherein the current sensing resistor is selectable to a value defining maximum current peaks.

11. The circuit arrangement of claim 1 wherein the low DC voltage detector is adapted to detect a selectable voltage of 3.3V or 5V.

12. The circuit arrangement of claim 1 wherein the current sensing resistor arrangement regulation provides through a rise and fall times of a current pulse along the regulatable current path to the gate of the FET an output to the load circuit with a wave form characterised with a trapezoidal shape.

* * * * *